United States Patent

Ference et al.

[15] 3,700,101
[45] Oct. 24, 1972

[54] CONTAINER INSPECTION APPARATUS

[72] Inventors: Richard N. Ference, Trafford; Albert Grega, Monroeville; James A. Miller, Apollo; Ray T. Stewart, New Kensington; David M. Stricker, Lower Burrel, all of Pa.

[73] Assignee: Aluminum Company of America, Pittsburgh, Pa.

[22] Filed: May 18, 1971

[21] Appl. No.: 144,424

[52] U.S. Cl. ................... 209/80, 209/88, 209/111.8, 324/40
[51] Int. Cl. ............................................. B07c 5/344
[58] Field of Search .......... 209/88, 80, 111.8; 324/40

[56] References Cited

UNITED STATES PATENTS

| | | | |
|---|---|---|---|
| 3,371,781 | 3/1968 | Armbruster | 209/111.8 |
| 3,465,878 | 9/1969 | Ochs | 209/111.8 X |

*Primary Examiner*—Richard A. Schacher
*Attorney*—Arnold B. Silverman

[57] ABSTRACT

Apparatus for inspecting sealed containers, including vacuum sealed containers having deflectable panel indicators. A sensing head having an electrically insulating pad and a generally centrally disposed eddy current sensor secured within a bore of the pad. The insulating pad and eddy current sensor are urged downwardly by a restraining means and are adapted to be moved upwardly uniformly or irregularly responsive to contact with a container wall. The eddy current sensor has a lower surface disposed radially inwardly and spaced upwardly with respect to the annular lower surface of the insulating pad. Conveyor means adapted to move a plurality of sealed containers to an inspection station with the containers disposed in underlying position with respect to the sensing head and the insulating pad in contact with a container wall. First detector means for emitting a signal indicating that a container is positioned at the inspection station. Logic circuit means responsive to an eddy current sensor reading sampled after the first detector means signal to compare the sensor reading with a predetermined standard incorporated within the sensor control circuit means and emit a signal indicating whether the container at the inspection station is properly sealed. Reject means for removing improperly sealed containers from said conveyor means responsive to the circuit means signal indicating that the container is improperly sealed. Second detector means for emitting an indication that a container has emerged from the inspection station for initiating operation of the reject means when the circuit means signal has indicated that the container is improperly sealed.

13 Claims, 11 Drawing Figures

PATENTED OCT 24 1972

INVENTORS
Richard N. Ference, Albert Grega, James A. Miller
Roy T. Stewart and David M. Stricker
BY
Arnold B. Silverman
ATTORNEY

CONTAINER INSPECTION APPARATUS

BACKGROUND OF THE INVENTION

1. Field of the Invention

This invention relates to apparatus for measuring the vacuum present in a sealed container by employing a non-contacting sensor which generates an electrostatic field which is entered and distorted by an electrically conductive container end wall. More specifically, this invention relates to such apparatus adapted to provide an effective measurement on container end walls having irregular configuration including non-symmetrical field distorting conductive portions.

2. Description of the Prior Art

It has been known that a vacuum sealed container may be provided with a container end wall, such as a closure or can end which has a vacuum indicating panel portion. Such indicators are generally outwardly concave when a vacuum is present and outwardly convex when there has been a meaningful reduction in the degree of vacuum present. This factor has facilitated non-destructive inspection of vacuum sealed containers in order to determine whether a desired degree of vacuum has been retained.

It has also been known to employ electrical means including magnetic field generating sensors which rely upon distortion of the magnetic field by a magnetic container wall, such as a ferro-magnetic closure or can end. See U.S. Pat. Nos. 3,206,027, 3,392,829 and 3,137,160.

It has also been known to provide proximity detectors secured within non-magnetic or non-conductive heads which are in contact with the container wall. See U.S. Pat. Nos. 3,064,807, 3,371,781 and 3,469,689. Such non-electrical head materials minimize the degree of interference with the field. In addition, such structures and other means have been employed to provide substantially uniform spacing between the sensor and the container end wall. See U.S. Pat. Nos. 3,206,025, 3,295,676 and 3,416,360. Many of these disclosures and others provide reject means which automatically displace a sealed container from conveying apparatus when a signal is received indicating that an improperly sealed container has been detected.

One characteristic which is lacking in the prior devices is the ability to obtain standard comparison references with respect to container walls which are not symmetrical about their central axis. In addition, for numerous types of end walls, such as those containing integral opening devices, portions thereof will contain an outwardly disposed lever pull tab, integral rivet heads, reinforcing ribs and other portions which are composed of electrically conductive material and produce a lack of symmetry in such structures. These features can provide both irregular field distortion and a lack of structural uniformity in the rim which interferes with contact between the rim and the sealing head. In view of the very high commercial rates of inspection which are required for acceptable, economic manufacturing and sealing, it is difficult to incorporate any system of indexing or registering such sealed containers in order to establish uniformity of position between the container wall irregularities and the sensing head.

It has been customary where sealed cans have an integral opening device or other irregularities on one end and a plain end on the other to inspect the plain end for desired pressure conditions. Although this frequently involved the need to invert the sealed container in order to expose the plain end to the inspection equipment, the absence of suitable equipment to inspect the end containing the integral opening device has made this necessary.

There is, therefore, a need for an efficient, economic means for inspecting for the presence of a desired vacuum in sealed containers at high rates of speed regardless of whether the sealed containers have field distorting irregularities and regardless of whether the sealed container has been indexed with respect to the inspecting apparatus.

SUMMARY OF THE INVENTION

The above-described need has been satisfied by the present invention. This invention provides a sensing head having an electrically insulating pad which has an annular base portion with a lower surface adapted to be in firm engagement with a portion of a container wall. An eddy current sensor is secured to the insulating pad within a hollow bore therein and has a lower surface spaced upwardly from the insulating pad lower surface. The pad has restraining means which yieldingly resists relative upward movement of the pad and sensor relative to the remainder of the sensing head.

Conveyor means are adapted to sequentially move a plurality of container members to an inspection station which is located at the sensing head. First detector means emit a signal indicating that a container is positioned at the inspection station. Logic circuit means responsive to an eddy current sensor reading, sampled after the first detector means signal, emits a signal indicating whether the container at the inspection station is properly sealed or improperly sealed. The state of the sensor output is determined within the sensor control circuit (herein also referred to as the sensor output signal or sensor signal) by comparing the sensor signal to a preset standard. Reject means remove an improperly sealed container from the conveyor means responsive to a logic circuit means signal indicating that the container is improperly sealed. This apparatus also has second detector means for emitting an indication that a container has emerged from the inspection station and for initiating operation of the reject means when the circuit means signal is to indicate that the container is improperly sealed.

In a preferred form the first detector means includes a light emitter, which is preferably a light emitting diode, and a light receiver. The second detector means also includes a light emitter and a light receiver disposed on opposite sides of the conveyor means.

The pad restraining means is preferably a bellows provided with a source of compressed air. The lower surface of the insulating pad extends farther downwardly than the upper surface of the container wall so that movement of the container to the inspection station results in the container urging the insulating pad uniformly or angularly irregularly upwardly. Uniform circumferential contact between the lower surface of the insulating pad and the container surface is established regardless of whether the insulating pad displacement is uniform or irregular.

In those instances where the container end wall has non-symmetrical conductive field distorting irregularities, the pad may be positioned with an inclined orientation as a result of the irregularities.

It is an object of this invention to provide apparatus for rapidly and economically measuring the panel deflection of a container sealed at pressure conditions other than atmospheric and automatically providing for removal of a rejected container from the conveying means.

It is another object of this invention to provide such apparatus which employs an electrostatic field generating sensor and is employed with a container wall which is electrically conductive and distorts the electrostatic field as it enters the same.

It is another object of this invention to provide such apparatus wherein the detector may be employed with container walls having symmetrical configurations and container walls having non-symmetrical configurations established by integrally formed or separately attached conductive elements which distort the electrostatic field.

It is another object of this invention to provide such apparatus which functions at rapid commercial speeds without being time related as to operation of either the inspection or the reject apparatus, with such activities being initiated through electrical monitoring of the presence of a sealed container at and departure of a sealed container from the inspection station.

It is yet another object of this invention to provide such apparatus which simply and economically may be incorporated into existing packing and sealing operations without the need for substantial investment in equipment.

These and other objects of the invention will be more fully understood from the following description of the invention, or reference to the illustrations appended hereto.

DESCRIPTION OF THE PREFERRED EMBODIMENTS

Unless otherwise indicated, the expression "container wall" as used herein shall be employed to refer to container walls having at least a panel portion adapted to be deflected responsive to pressure differential between the interior of the sealed container and the surrounding atmospheric pressure and shall include symmetrical and unsymmetrical container walls which are composed, at least in part, of electrically conductive materials and employed in various types of containers such as can ends, closures for jars and bottles and as walls for other forms of containers.

Figures 1, 2, 5:
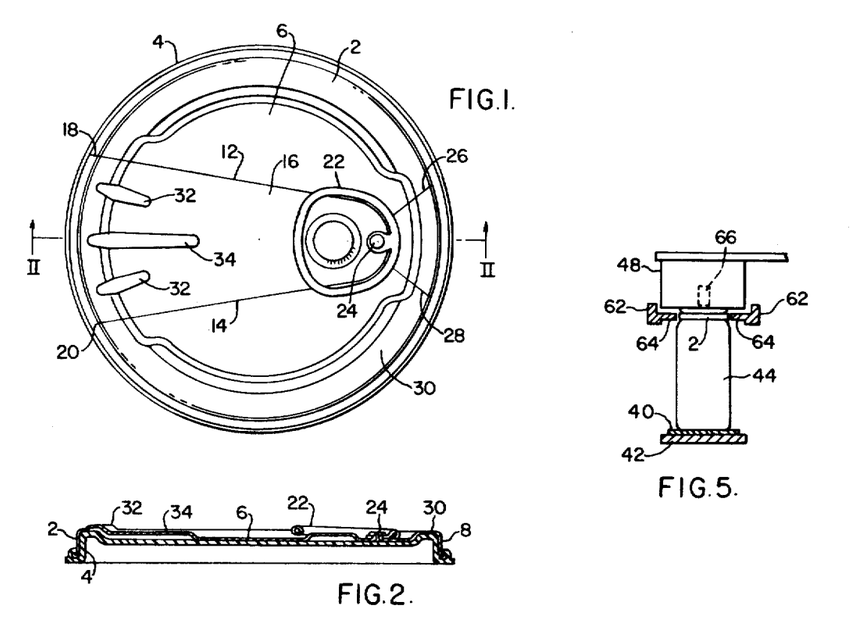
FIG. 1 illustrates a plan view of a form of closure having an easy opening device which provides for lack of closure symmetry.
FIG. 2 is a sectional view of the closure shown in FIG. 1 taken through 2—2.
FIG. 5 is a transverse elevational view of a portion of the sensing and inspecting apparatus including the conveying means, the sealed container and the sensing head.

Referring now more specifically to FIGS. 1 and 2, there is shown a form of container wall which is a two piece closure having an integral opening device. It is seen that the closure consists of an outer closure member 2 and an inner closure member 4 which is a gasket material and may serve as a reclosure, if desired. The outer closure member 2 has a top panel portion 6 and a depending skirt 8. A pair of scorelines 12, 14 defining a tear section 16 are provided. It is noted that in the form shown scoreline 12 extends down the skirt 8 and may terminate at or closely adjacent the lower edge of the skirt. Scoreline 12 has a skirt sector 18. Scoreline 14 has a skirt section 20 which extends only part way down the skirt 8. This permits fracture of the skirt 8 and removal of the closure as a single piece as a result of the connection between tear sector 16 and the remainder of closure 2.

A pull tab 22, which preferably is a metal lever tab providing a mechanical advantage, is secured to the top panel 6 adjacent the end of the scorelines 12, 14 by means of a suitable fastener which is preferably an integral rivet 24. Supplementary scorelines 26, 28 facilitate removal of the closure after scoreline 18 has been fractured. In the form shown the inner portion of the top panel 6 is recessed with respect to the outer rim 30 of the panel 6.

As is shown in FIGS. 1 and 2, integrally formed upwardly directed ribs 32, 34 provide stiffening means within the tear sector 16 and facilitate opening of the container. It will be noted that the pull tab 22 and ribs 32, 34 extend upwardly from the panel 6 and contribute to a closure structure which is not symmetrical with respect to the central axis of the closure. As both the pull tab 22 and the ribs 32, 34 are composed of conductive material, when the closure enters an electrostatic field, eddy currents will be induced not only in the flat portion of the closure panel 6, but also in the pull tab 22 and ribs 32, 34. This results in the pull tab 22 and ribs 32, 34 also distorting the electrostatic field. It will be further appreciated that the relative angular orientation of the closure 2 with respect to a sensor disposed in overlying position with respect to the panel 6 will produce variations at different positions in the field depending upon the precise orientation of the closure 2. For example, in FIG. 1 the angular orientation of the closure 2 is such that the pull tab 22 is in an right hand portion of the drawing. Had the closure been rotated 180° about its central axis, the closure 2 would be in an angular position which placed the pull tab 22 in the left hand portion of the drawing. The apparatus of this invention does not, however, require indexing of the closure with respect to the sensor to overcome the effect produced by this irregular distortion.

Figure 3:
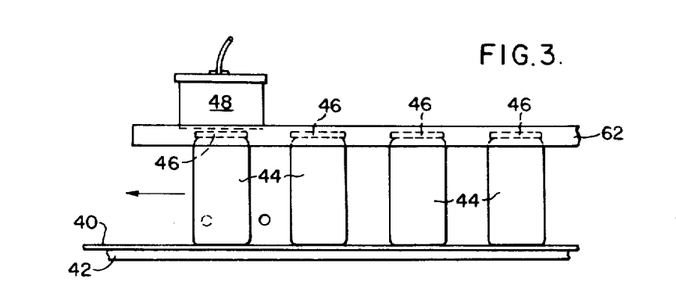
FIG. 3 is a partially broken away schematic elevational view, illustrating the sensing head of this invention and sealed containers moving on conveyor means.
Figure 4:
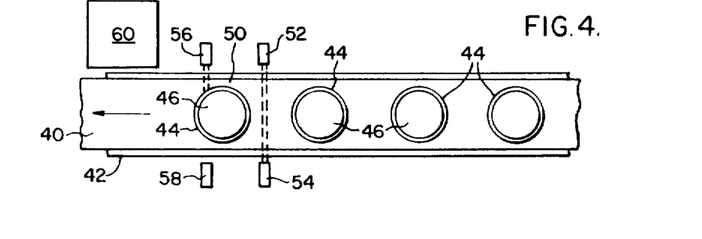
FIG. 4 is a partially schematic plan view of a form of the conveying and detector means employed in this invention.

Reference is now made to FIGS. 3 through 5 which show somewhat schematically the general arrangement of the system of this invention. As is shown in FIG. 3, conveyor means 40 are supported upon a suitable structure 42 and are provided with conventional drive means (not shown). A plurality of sealed containers 44, which in the form shown are bottles, are sealed with closures 46. The leading portion of downstream bottle 44 illustrated in FIG. 3 is disposed in the inspection station in underlying position with respect to sensing head 48.

As is shown in FIG. 4, the leading container 44 when in the inspection station (indicated generally by the reference numeral 50) is in underlying position with respect to sensing head 48 and is disposed forwardly of the first detector means. In the form shown the first detector means consists of a light emitting source 52 and receiver 54 which are positioned on opposite sides of the conveyor 40. The bottle 44 in the lead position is disposed in an interfering relationship between the elements of the second detector means, which in the form shown has a light emitting source 56 and a receiver 58. Light emitting source 56 and receiver 58 are disposed on opposite sides of the conveyor 40.

The detailed operation of the light emitting sources 52, 56 and receivers 54, 58 will be discussed below in connection with a description of the electrical portion of the apparatus. To generally indicate their function, it should be noted that as the downstream edge of a container (generally the closure portion of the sealed container) moves in front of the light beam generated by the emitter 52, the beam is broken and as the container continues its downstream travel the beam continuity is reinstated. Reinstatement of the beam between the emitter 52 and receiver 54 indicates that the container has moved to the inspection station 50 and that the sensor's output signal should be sampled for inspection purposes. When the container 44 is in the inspection station 50 the beam emitted by emitter 56 is broken. After the inspection has been completed and the container moves farther downstream, the beam generated by the emitter 56 and receiver 58 will be reinstated and this serves as an indication that the container 44 has cleared the inspection station 50 and moved downstream toward the reject system 60. In those instances where an imperfectly sealed container has been determined to exist, the reject system is operated (responsive to reinstatement of the signal between emitter 56 and receiver 58) to cause the reject system 60 to remove the container from the conveyor 40.

FIG. 5 shows a transverse sectional view of the inspection station 50 with a container 44 in place. This figure shows a preferred form of guide rails 62 which have container contacting protrusions 64 which engage opposed skirt edges of closure 2. The guide rails 62 serve to keep the top panel 6 of the closure 2 in the desired aligned position with respect to the sensor 66 in order to provide for accurate readings in a fashion to be described further below. This is accomplished primarily by physical resistance to transverse movement on the conveyor 40 of sealed containers 44.

Figure 6:
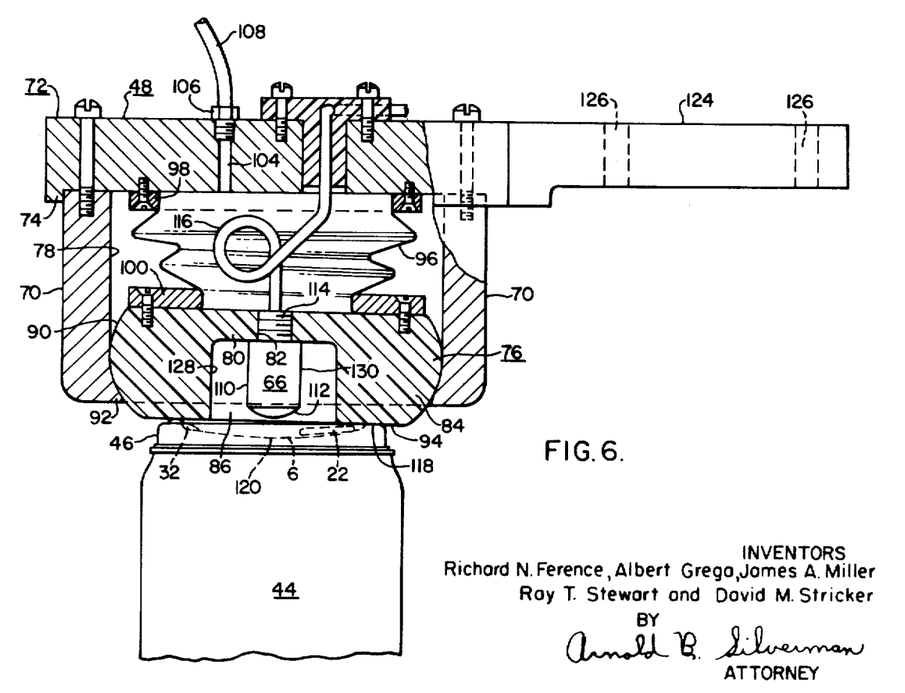
FIG. 6 is a partially broken away and partially schematic sectional illustration of the sensing head of this invention showing a sealed container positioned thereunder.

Reference is now made to FIG. 6 where a partly broken away view of the sensor head structure is shown. It will be noted that the sensor head 48 has a generally tubular sensing head sidewall 70 and a sensing head top wall 72 which is secured in overlying relationship with respect to annular sidewall 70. In the form shown it will be noted that a downwardly directed flange 74 of top wall 72 is disposed radially outwardly of sidewall 70 and overlaps the upper portion of wall 70. These portions of the sensing head 48 are adapted to remain relatively stationary with respect to the operative portions of the sensing head, i.e., the insulative pad 76 and sensor 66.

It will be noted that an electrically insulative pad 76 is received within the bore 78 of sidewall 70. The insulative pad 76 has an upwardly disposed transverse wall 80 which is provided with an opening 82. It also contains a depending annular sidewall 84 which defines a counterbore 86 which is preferably aligned with opening 82 in transverse wall 80. In the form shown, the annular sidewall 84 has a transversely outwardly convex wall 90 which is in overlying supported relationship with respect to radially inwardly directed extension 92 of sidewall 70. This serves to provide a stop on relative downward movement of the insulating pad 76 with respect to the sidewall 70. It is also noted that the insulative pad 76 has an annular, generally flat lower surface 94 which is adapted to engage the upper surface of the closure 46 in a fashion to be described in detail below.

In the form shown, a bellows 96 is secured to the lower surface of top wall 72 by means of locking ring 98. The lower end of the bellows 96 is secured to the upper surface of transverse wall 80 by means of locking ring 100. Top wall 72 is provided with a passageway 104 which extends generally vertically therethrough. A tubing connector 106 is received in passageway 104 and has an upwardly directed extension to which one end of tube 108 is secured. Tube 108 is secured to a source of compressed air (not shown). Air is introduced into the interior of bellows 96 to create a downward force urging the insulating pad 76 into contact with extension 92 of sidewall 70. The pressure provided on the interior of bellows 96 is adequate to yieldingly urge the insulating pad downwardly into firm contact with the underlying container wall.

In the preferred form of this invention, the annular lower surface 94 of the insulating pad 76 is disposed in a plane lower than the bottom of sensor head sidewall 70. The underlying conveying means is so positioned that the upper surface of a sealed container will be at a higher level than the lower surface 94 of the insulating pad 76, but lower than the lower extremity of sidewall 70. The container is moved along the conveyor with sufficient force to cause the upper portion of the sealed container 44 to engage the insulating pad 76 and urge it either uniformly or irregularly upwardly into bore 78 of the sensor head 48. The insulating pad is so mounted as to permit such translational or translational and rotational movement against the resistance of the air pressure in the bellows 96. This positive displacement effected by mechanical interaction between the insulating pad 76 and sealed container 44 ensures proper firm engagement between the pad 76 and the upper surface of the closure 46. In addition, the sensor 66 is secured to the pad 76 and moves as a unit therewith. Thus, uniformity of positioning of the sensor with respect to the closure is also ensured.

In view of the desire to have the insulating pad 76 composed of a material which will not distort the electrostatic field and which will perform satisfactorily under the wear imposed by repeated contact with sealed containers, materials such as nylon or another hard plastic are preferably employed. Other materials having these characteristics may be used, if desired.

It is noted that the sensor, in the form shown, is a suitable coil adapted to generate an electrostatic field between the underlying closure top panel 6 and the sensor 66. It will be noted that, as is shown in FIG. 6, the particular closure positioned under the sensing head 48 has an upwardly concave configuration indicating that a vacuum is present within a container. Were the vacuum to be lost to any significant degree, the panel would deflect upwardly and have an upwardly convex configuration. The sensor may be an air core sensor. The closure may be an electrically conductive material, which may or may not be magnetic in nature, such as aluminum or steel. It is noted that the sensor 66 has a generally cylindrical sidewall 110, a downwardly convex bottom wall 112 and an upper connecting sector 114. Upper connecting sector 114 is received within opening 82 of transverse wall 80. Electrical energizing means 116 extends through the opening 82 in transverse wall 80 and is connected to sensor 66. The electrical energizing means may be introduced through an opening in the top wall 72 of the sensor head 48.

It will be noted that the sensor 66 is in spaced overlying relationship with respect to the center of the top panel 6. In the preferred form of the method the sensor will substantially continuously generate an electrostatic field which will be entered by conductive closure 46, which is a portion of sealed container 44. As a result of the field being entered by conductors, the field will be distorted in the regions of the panel 6, the ribs 32, 34 and pull tab 22. The signal which reflects the degree of distortion of the electrostatic field between panel 6, and as a result reflects the panel position, is continually electrically compared with a standard signal within the sensor control circuit. The sensor control circuit output is digitalized and at the appropriate instant the sensor output is sampled. Depending upon whether the sealed container is found to be effectively sealed or defectively sealed the reject mechanism will or will not be energized. The first detector means described generally above, which includes light emitter 52, assists with determination that the sealed container is in the inspection station and that the sensor output signal should be sampled. The second detector means, which includes emitter 56, assists with determination of when the reject mechanism should be activated to remove a defectively sealed container. As the first and second detector means control operation of the circuit means and reject circuit, they are responsive directly to movement of containers thereby and no timing mechanism need be employed in order to coordinate the conveyor speed and relative sealed container positions with the operation of the inspection apparatus. This simplifies the equipment and eliminates the need for time coordinated delivery of the containers to the inspection station.

It will be noted that, as is shown in FIG. 6, the ribs 32, 34 will cause the sealed container 44 to raise the overlying portion of the insulating pad 76 to a higher level than does the tab 22 or closure rim 118. As a result, the closure, because of its lack of symmetry, establishes an uneven vertical displacement of the pad. As the sealed container bearing the irregularly configurated closure 46 has not been registered or indexed in any fashion with respect to the sensing head 48, the distortion of the electrostatic field emitted by sensor 66 will occur at different angular dispositions of the closure as the sealed containers 44 move sequentially under the sensing head 48. As was noted above, in order to attain the desired high inspection speeds which make the inspection apparatus of this invention commercially advantageous, the system operates independently of any timing device. The initiation of sampling of the sensor reading is correlated with the movement of the container into the inspection station. Although this movement is effected without the need to index the container, the random orientation of the sealed container is readily accommodated by the present system. It is noted that the sensing device is positioned in overlying relationship with respect to the closure center 120. The distortion created by the presence of ribs 32, 34 and pull tab 22, which both may be composed of an electrically conductive material, will provide a uniform quantitative distortion of the electrostatic field regardless of the relative orientation of the closure 46 with respect to the sensor 66. In establishing the standard for a given closure, be it symmetrical about its central axis or irregularly configurated, the distortion of the field will occur in the standard as established by an effectively sealed container. This distortion will also appear to substantially the same degree in an improperly sealed container. In this fashion, the effect of the distortion created by conductive irregularities is eliminated, as they are present to the same degree and produce the same amount of field distortion regardless of the angular orientation of the closure with respect to the sensor. Also, they are present to substantially the same degree in the properly as well as improperly sealed containers. An important characteristic of this invention is the establishment of a uniform reference position of the sensor 66 with respect to the underlying sealed container 44 which permits direct sequential comparison of the series of containers with the standard reading without regard to closure orientation or inclination of the insulating pad 76 resulting from the closure's lack of symmetry. This is accomplished by the yieldingly downwardly urged pad 76 and the characteristics of sensor 66 and the related electrical components.

It will be appreciated that the action of the air pressure in the bellows 96, which preferably establishes a downwardly directed force of about one to three pounds on the insulating pad 76, creates a yieldably established downwardly directed force on the pad 76. This permits the pad to be displaced vertically substantially uniformly in closures which do not have an upwardly projecting irregularity. It also permits the pad 76 to be displaced generally upwardly through translation and rotation in irregular fashion as is shown in FIG. 6. Regardless of the positioning of the pad, as a result of the bellows 96 and air pressure, it will be subjected to annular firmly secured compressive contact with the underlying closure. This facilitates uniform positioning of the sensor 66 with respect to the center of the closure 120 and standardizes the output signal which is employed for comparison purposes. In the preferred form of the invention, the sensor 66 may be energized continuously with comparison readings with the standards being made continuously and sampled only when the closure being inspected is disposed at the inspection station. It will also be appreciated that the need for feed screws and other container spacing means is eliminated.

Figure 7:
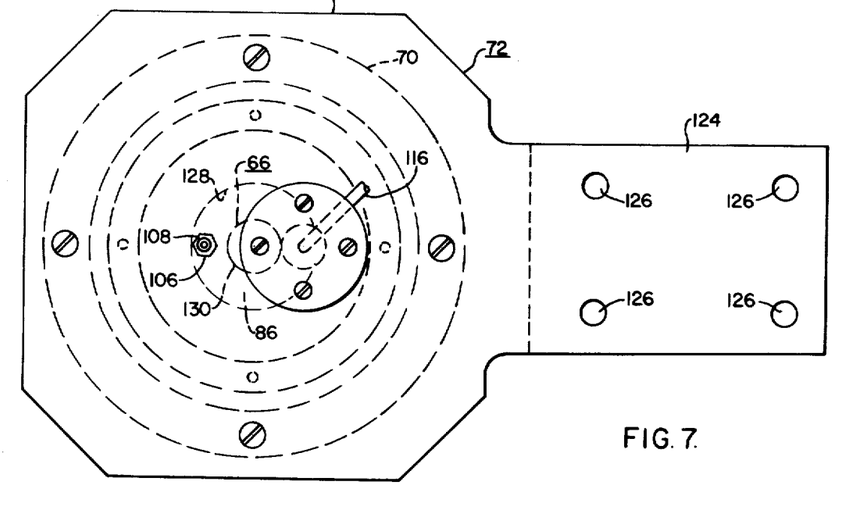
FIG. 7 is a top plan view of the sensing head of this invention.

FIG. 7 shows a plan view of the sensing head 48 and shows the top wall 72 having a body portion 122 and adjacent anchoring portion 124 having reduced width with respect to the body portion 122 and provided with a series of fastener receiving openings 126. The top wall 72 is provided with the tubing connector 106 and has an opening through which the electrical current carrying means passes. The sensor 66 receives its electrical current carrying means through an opening in locking ring 100 and opening 82 in the transverse wall 80 of insulating pad 76. As is shown in FIG. 6, the sensor head sidewall 70 has its upper extremity in surface to surface contact with the underside of top wall 72. The counterbore 86 is disposed with its center generally coaxial with the central axis of the sensor 66. The inner surface 128 of the pad cooperates with the outer surface 130 of the sensor 66 to define an annular space therebetween.

Figure 8:
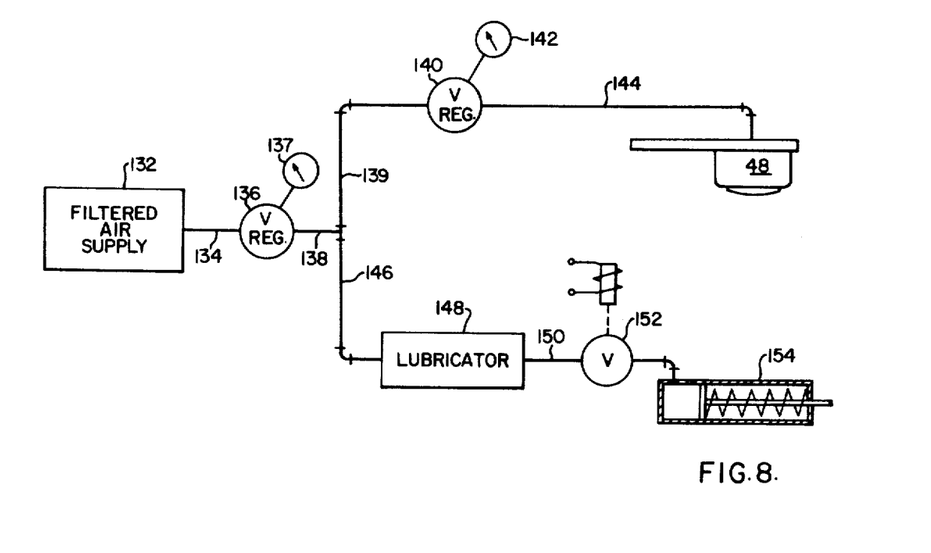
FIG. 8 schematically illustrates the air handling system of this invention.

In the preferred form of the invention, the bellows and reject mechanism are operated by fluid pressure and, in the form shown, air is employed. The air handling system is shown in FIG. 8. As is shown schematically in this figure, the system has a filtered air supply 132 which is a source of compressed air. Air passes from the filtered air supply through line 134 to primary regulator 136 which has pressure gage 137. The output of primary regulator 136 is divided into two segments. One leg of the output flows through lines 138, 139 to secondary pressure regulator 140 and then through line 144 into the sensing head 48 for introduction into bellows 96 (not shown in this figure). Secondary regulator 140 is provided with pressure gage 142. The other leg of the output of primary regulator 136 flows through line 146 to lubricator 148 and into a solenoid operated control valve 152. This valve 152 powers the reject cylinder 154, the operation of which will be described in greater detail below.

Figure 9:
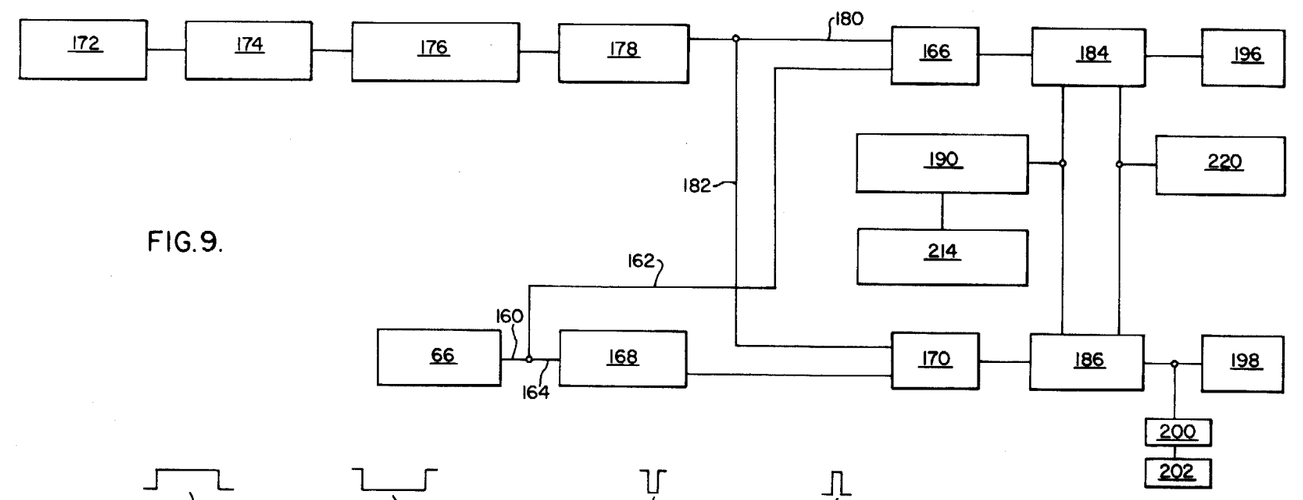
FIG. 9 illustrates the electrical system employed in inspecting the sealed containers and rejecting or accepting the individual containers.

Referring now to FIGS. 4 and 9, the operation of the electrical system of this invention will be considered in greater detail. FIG. 9 shows the sensor 66 whose electrical output line 160 transmits the signals by electrical lines 162, 164 to first logic gate 166 and through inverter 168 to second logic gate 170. The sensor 66 preferably is continuously energized by means of an alternating current source which has been generally indicated by the number 116 (FIG. 6). In addition to generating the electrostatic field, in the preferred form of the invention the sensor 66 and its control circuit will provide an initial comparison function. For simplicity of reference as used herein reference to the sensor output or words of similar import will, unless expressly indicated otherwise, refer to the means for generating the electrostatic field, monitoring changes therein and emitting a direct voltage signal when the changes exceed a predetermined standard. When a conductive container wall breaks the field the voltage in the sensor is increased. When the increase in voltage is sufficient to confirm the presence of a container wall thereunder (by exceeding a predetermined voltage level), the sensor 66 emits a signal. The precise amount of change will be determined by whether the panel is convex or concave, but in either event, the amount will exceed the minimum voltage needed to establish the presence of a container at the inspection station. While, if desired, an analogue voltage signal may be taken from the sensor, it is preferred to employ a digital output wherein a sensor output of logic "1" means either accept or reject and an output of logic "0" means the opposite. The circuitry for the sensor circuit may be any suitable conventional type and this circuitry forms no part of the invention per se. Suitable sensor arrangements are those sold by Sensor Corporation of Greenwich, Connecticut under the designation series 3210. This signal from sensor 66 is ultimately employed as a D.C. voltage for basis of comparison.

As the sequential feeding of sealed containers is effected at a high speed, such as 1,000 containers per minute, it is essential that the comparison be effected only when the signal emerging from the sensor 66 was the result of a measurement during the instant a sealed container 44 was positioned at the inspection station 50. While throughout the description, in the interest of simplicity, reference has been made to a sealed container 44 being positioned at the inspection station 50, it is not intended to imply that it is necessary to have the container stop moving in order to obtain a reading at the inspection station. The equipment is designed to operate with the container moving at substantial linear speed through the inspection station 50 without any reduction in speed. Reference herein to containers being positioned at the inspection station or words of similar import, shall not imply any reduction in speed or stoppage of the moving container.

The coordination of sensor reading with container position for purposes of comparison is effected by means of a first detector 172, which in the form shown is a light emitting diode. While the light emitting diode is preferred because of the highly refined measurement which results from its relatively narrow beam, it will be appreciated that while one may expect reduced sensitivity, a photoelectric cell or other light source may be used. This light emitting diode 172 and its receiver are shown in FIG. 4 schematically as 52 and 54. They are positioned in aligned relationship with respect to each other on opposed sides of the conveyor means 40.

Figure 10:
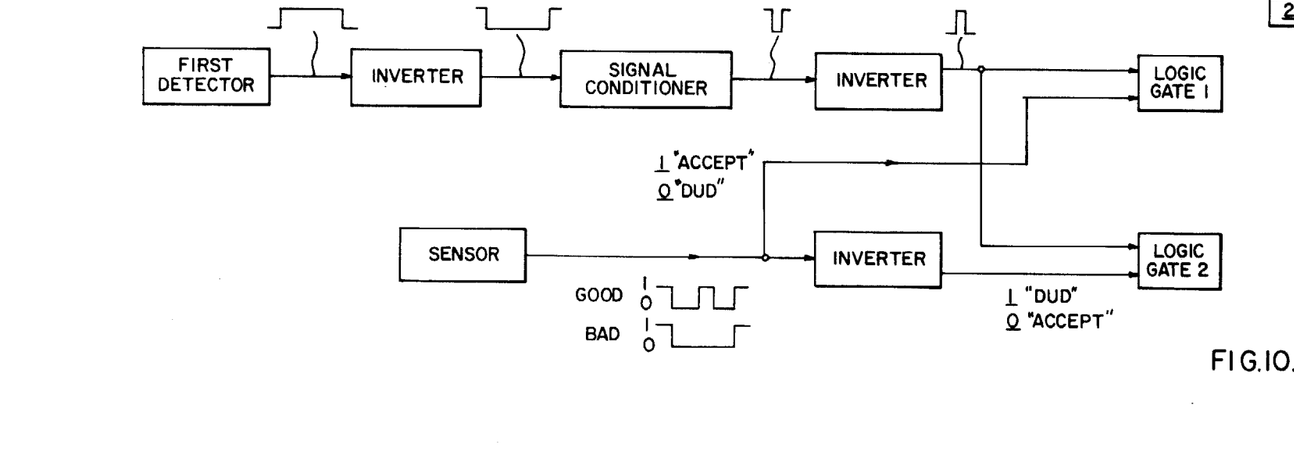
FIG. 10 is related to FIG. 9 but shows details of the signal at various stages.

Referring once again to FIG. 4, it will be appreciated that the light beam will normally be continuous between the emitter 52 and receiver 54. The light emitter 52 and light receiver 54 are preferably positioned at such a height as to cause the light to impinge upon the closure portion of the sealed container in order to effectively interrupt the light beam. More specifically, the light beam will generally impinge upon the closure skirt. It will be appreciated that in the initial condition the light beam will be continuous between the emitter and receiver. As the container moves downstream on the conveyor means 40, the light beam will be interrupted. The continued movement of the container downstream causes the container to move out of light beam interrupting position and the light beam is reestablished. The inspection station 50 is so positioned that the instant the light beam from emitter 52 is reinstated the sealed container 44 is in the inspection station or position 50. Thus, the reestablishment of the light beam provides an indication that the output signal of the sensor 66 should be sampled as it now reflects a reading taken from a sealed container disposed at the inspection station. Referring now to FIG. 10, it is seen that in order to communicate this signal indicating reestablishment of the beam within first detector means 172, the signal is first inverted by inverter 174. Signal conditioner 176 modifies the signal by converting it into a pulse signal in order to prepare it for effective utilization. From the signal conditioner 176 the pulse signal is inverted by inverter 178. From there the signal is introduced into first logic gate 166 and second logic gate 170 by means of electrical lines 180, 182.

It will be noted that in the form shown first logic gate 166 is the gate through which signals indicating an acceptably sealed container pass. Second logic gate 170 is the gate through which signals indicating an improperly sealed container will pass. In the preferred form, first and second logic gates are NAND gates which are solid state gates having at least two input terminals and one output terminal. This form of gate is preferred as it reduces the amount of noise or electrical interference encountered. It is desired that the sensor control circuit input to the logic gates be set up in opposite phases or states in order to insure that an accept or reject signal is provided. It will be appreciated, however, should it be desired, other forms of gates such as NOR or OR or other conventional forms of gates may be employed in the system of this invention.

Signals from first detector means 172 enter first logic gate 166 or second logic gate 170. The signal from sensor 66 is fed directly into first logic gate 166 and is inverted by inverter 168 and fed to second logic gate 170. If the container is properly sealed, the output of sensor 66 combines with the output of first detector means 172 to create an output from first logic gate 166 which is fed to memory circuit 184 and is stored therein as an accept signal. If the container is improperly sealed, the output of sensor 66 combines with the output of first detector means 172 to create an output from second logic gate 170 which is fed to memory circuit 186 and is stored therein as a reject signal.

Where the sensor control circuit comparison has indicated that the output of sensor 66 has provided the reading of a sealed container which is properly sealed within the standard established, the output signal of memory circuit 184 (to be discussed below) will then be carried in the accept circuit. If desired, the memory circuit output may be fed to an accept indicating mechanism relay 196 which might turn on an accept light (not shown) or otherwise be employed to provide a positive indication that the specific container has been inspected and is acceptable.

In those situations wherein the sensor 66 has yielded a reading that the container is improperly sealed, the signal emerging from memory circuit 186 may be carried to a positive reject indicating mechanism relay 198 which might be used to turn on a light or otherwise provide an indication of rejection. In addition, the signal will be carried to a reject mechanism. The reject system contains a relay 200 and reject solenoid 202. Upon receipt of the signal from memory circuit 186, relay 200 emits a signal to reject solenoid 202 which activates the reject mechanism and removes the improperly sealed container. Referring now to FIG. 1, it is seen that the reject solenoid 202 is connected to an air cylinder 204 which has a piston arm 206 and a container contacting element 208. When the appropriate reject signal is given and the air cylinder operated, it will move the container 44 from conveyor means 40 onto reject conveyor means 210. In this fashion the rejected container 44 is instantaneously withdrawn from the conveyor means and only containers passing the inspection are allowed to continue on the conveyor.

As was indicated above, one of the primary objectives of this apparatus is to avoid the need to index the closure orientation with respect to the sensing head. It is also desired to make the inspection speeds independent of time so that the inspection device will operate at whatever speeds the containers are moved through it. Also, the system will operate effectively regardless of whether uniform spacing is maintained between successive containers. The sensing system and the method in which this operates independent of time have been considered above. The manner in which the reject system is coordinated with container position will now be considered.

Having considered the means of effecting the combination of signals of the first detector means 172 and sensor 66 to effect output from first logic gate 166 and second logic gate 170 as an input into memory circuit 184 and memory circuit 186, respectively, the other input which combines with the first memory circuit input to establish a memory circuit output will be described.

Figure 11:
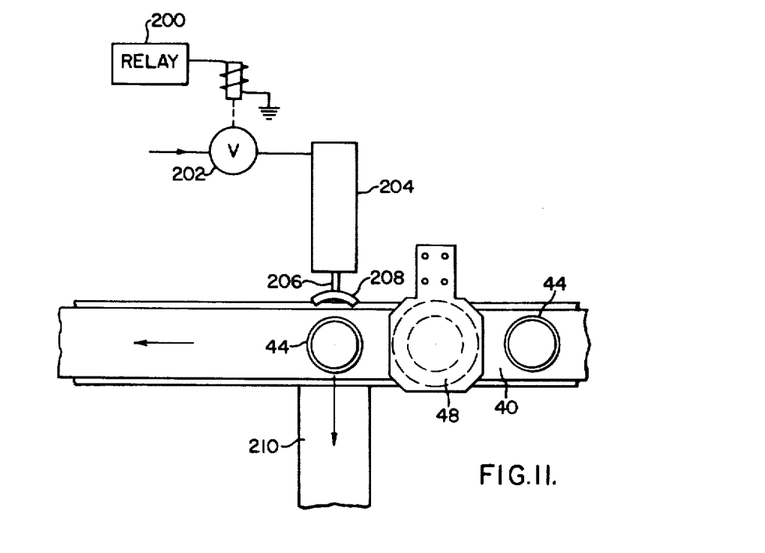
FIG. 11 shows a schematic view of the reject mechanism employed in this invention.

The photoelectric detector 214 is one form of the second detector means 56, 58 shown in FIG. 4. While this is preferably a photoelectric detector, other suitable forms of light emitting and receiving components may be employed. For example, a light emitting diode would increase the sensitivity of the second detector means, but would also increase the cost of the system. The photoelectric detector 214 initially has an unbroken light beam between emitter 56 and receiver 58. When a container moves into inspection station 50 the light beam emitted by emitter 52 is reinstated, while the light beam emitted by emitter 56 is interrupted. Once again, it is preferred that the closure portion of the sealed container serve as the light breaking means. After the inspection has been completed, the container moves out of the inspection station 50 and toward the reject system 60. The reject system is preferably closely adjacent to the inspection station 50 to minimize the distance which the sealed container must travel between the two stations. When the container 44 leaves the inspection station 50 the light beam emitted by emitter 56 is reinstated. At that point a signal is transmitted by the photoelectric detector 214 to signal conditioner 190 which converts the change in detector 214 into a pulse signal which is fed to memory circuits 184, 186. If an accept signal is stored in memory circuit 184, the pulse signal from detector 214 will combine therewith to establish an accept output signal therefrom. The signal will be inverted and fed to relay 196. If desired, this signal may be employed to operate a light or other form of accept indicator. If a reject signal is stored in memory circuit 186, the pulse signal from detector 214 will combine therewith to establish a reject output signal therefrom. The signal will be inverted and fed to relay 198 which may be connected with a reject light or another form of reject indicator. In addition, the signal from memory circuit 186 will be fed to relay 200 which is connected to solenoid 202 to initiate operation of the reject mechanism. If the container has been found to be improperly sealed, the signal from memory circuit 186 enters the relay 200. The relay 200 is adapted to proceed with the signal to the reject solenoid 202 which causes it to operate the air cylinder 204 (FIG. 11) and physically contact the container 44 to move it off conveyor means 40. The projected piston arm 206 of cylinder 204 may conveniently be returned to its initial position by means of spring means (not shown) or fluid operation means.

As was stated above, the output signal of photoelectric detector 214 is converted into a pulse signal by signal conditioner 190 and the pulse signal is fed to memory circuits 184, 186 to establish an output in one of circuits 184, 186. In the preferred form the memory circuits will have flip-flops and the one which emits a signal will change state. The photoelectric pulse will also reset the memory circuit 184, 186 which has had a flip-flop change of state and confirms that the other is in its original state. At this point the circuit is ready to handle the next succeeding inspection signal for the next container.

An added feature of the system is use of a system check 220 to turn on an indicator light (not shown) each time a bottle passes through a detector in order to confirm that the system is operating. If responsive to a photoelectric pulse from detector 214 and signal conditioner 190 either a reject or accept signal is not forthcoming from memory circuits 186, 184, respectively, the light does not go on. This indicates that the inspection system is not operating properly. If, on the other hand, the reject or accept signal is not extinguished after completion of the cycle, the system check light remains on to indicate this type of malfunction.

Referring now to FIG. 10, a more detailed representation of the circuitry signals employed in the system of this invention will be illustrated. This figure illustrates the system components up through first and second logic gates and illustrates a form of signal sequence selected for purposes of illustration. As is shown in the lower left hand portion of the figure, a sensor output signal having a logic value of "1" is assumed to indicate the presence of a properly sealed container and a logic value of "0" indicates an improperly sealed container. First and second logic gates function in opposite phase relationship. The logic value "1" is an accept signal and logic value "0" is a reject signal as fed from the sensor 66 to first logic gate. The signal from the sensor to second logic gate is inverted and second logic gate has logic value "1" as a reject signal and logic value "0" as an accept signal. In this fashion either the accept or reject memory means will have its flip-flop change state responsive to an output signal from first logic gate or second logic gate, respectively.

The second signal which enters dual input first and second logic gates originates with the first detector. In the example shown the generally upwardly directed signal emitted by first detector is first inverted. Subsequently, it is converted to a pulsed signal in signal conditioner which reduces the width of the signal. The pulsed signal is inverted and fed to first and second logic gates. The logic gates handle the respective dual input signals in the fashion described above to effect either an accept or reject action by the cooperatively arranged components which operate responsive to output signals from first and second logic gates, respectively.

Not only is the above-described apparatus suitable for use with various forms of container walls, be they symmetrical or unsymmetrical, with respect to conductor characteristics and physical configuration, but also the system is adapted to be employed with a wide range of container sizes. For example, if a sealed container of a different height and different diameter container end wall were to be employed, the spacing between the inspection pad 76 and conveyor means 40 would be adjusted accordingly. Also, the spacing between the guide rails 62 will be adjusted. Finally, the sensor 66 would be placed at the desired transverse position in order to monitor panel deflection. This position will generally be over the central region of the container wall.

It will, therefore, be appreciated that the container inspecting apparatus of this invention has a proximity sensor spaced in overlying relationship with respect to a deflected panel composed of an electrically conductive material, regardless of whether the container panel has structural irregularities which add increments of distortion of the electrostatic field in a non-symmetrical fashion. In addition, the system is adapted to operate at high speeds without the need for employing timing devices and without coordinating container speeds with sensor and system speeds. This is accomplished by sampling the output of the sensor 66 solely when a container is positioned at the inspection station and operating either accept or reject means responsive thereto. Also, the reject system is coordinated with the departure of a sealed container from an inspection station. In this fashion very high speed movement of the sealed containers may be effected with proper inspection being accomplished with respect to each container without the need for providing uniform spacing between successive containers.

Another advantage of this invention is that it automatically presents a uniform sensor reference position with respect to the container panel without the need to provide specific orientation of irregularly configurated panels with respect to the sensing head. Also, the positive downward stroke applied to the sensor head inspection pad and sensor results in effective circumferential contact about the periphery of the inspection pad and permits uniform or non-uniform vertical displacement of the inspection pad with respect to the container wall and remainder of the sensing head. Air means are the preferred means of effecting this desired downward displacement. It will be appreciated that the sampling of the sensor control circuit is so coordinated that it is accomplished after the leading portion of the container has partially displaced the inspection pad and is in the inspection station. Similarly, detecting means coordinate the departure of the container from the inspection station with the reject means.

It will be appreciated that while for purposes of illustration a container in the form of a jar having an irregularly configured closure has been shown, various forms of containers and closures may be employed with the inspection device of this invention. Where a closure is being employed with a translucent container material it is generally preferred to have the detector means aligned with the closure portion of the sealed container. However, where container materials will effectively prevent the transmission of light therethrough, other portions of the sealed container may be aligned with the detector means.

Whereas particular embodiments of the invention have been described above for purposes of illustration, it will be evident to those skilled in the art that numerous variations of the details may be made without departing from the invention as defined in the appended claims.

We claim:

1. Apparatus for inspecting sealed containers comprising
   a sensing head having an electrically insulating pad and a generally centrally disposed eddy current sensor,
   said insulating pad and said eddy current sensor secured to each other and adapted to be moved as a unit,
   said eddy current sensor having a lower surface disposed radially inwardly and upwardly with respect to the annular lower surface of said insulating pad,
   pad restraining means resisting relative upward movement of said pad and sensor with respect to the remainder of said sensing head,
   conveyor means adapted to sequentially move a plurality of sealed containers to an inspection station with said containers disposed in underlying position with respect to said sensing head at said inspection station,
   first detector means for emitting a signal indicating that a container is positioned at said inspection station,
   logic circuit means responsive to an eddy current sensor signal sampled as said first detector means signal is received to emit a signal indicating whether the container at said inspection station is properly sealed or improperly sealed,
   reject means for removing improperly sealed containers from said conveyor means responsive to said circuit means signal indicating that said container is improperly sealed, and
   second detector means for emitting an indication that a container has emerged from said inspection station and for initiating operation of said reject means when said circuit means signal has indicated that said container is improperly sealed.

2. The inspection apparatus of claim 1 including
   said first detector means includes a light emitter and a light receiver disposed on opposite sides of said conveyor means and positioned upstream of said sensor head with respect to the direction of travel of said containers, and
   said second detector means includes a light emitter and a light receiver disposed on opposite sides of said conveyor means and positioned downstream of said sensor head with respect to the direction of travel of said containers.

3. The inspection apparatus of claim 2 including
   said insulating pad is annular with a restriction in the upper portion of the passageway running therethrough,
   said annular insulating pad and eddy current sensor are adapted to be displaced in a generally upwardly direction by the upper end wall of said container,
   said circuit means has logic gate means to emit a signal based on the signal received from said eddy current sensor only immediately after said first detector means emits an indication that a container is disposed at said inspection station, and
   said circuit means has memory circuit means which emit a signal responsive to a signal from said gate means only after said second detector means emits an indication that a container has emerged from said inspection station.

4. The inspection apparatus of claim 3 including
   said logic gate means includes a first logic gate in the accept circuit and a second logic gate in the reject circuit,
   said memory circuit means includes a first memory circuit in said accept circuit adapted to receive signals from said first logic gate and said second detector means, and
   said memory circuit means includes a second memory circuit in said reject circuit adapted to receive signals from said second logic gate and said second detector means, whereby upon receipt of an accept signal from said sensor means and a signal from said first detector means said first logic gate will emit a signal to said first memory circuit which will emit a signal in response to receipt of this signal and a signal from said second detector means and upon receipt of a reject signal from said sensor means and a signal from said first detector means said second logic gate will emit a signal to said second memory circuit which will emit a signal in response to receipt of this signal and a signal from said second detector means.

5. The inspection apparatus of claim 4 including
   accept and reject indicating means operating responsive to receipt of a signal from said first memory circuit and said second memory circuit, respectively, and
   said reject means operating responsive to receipt of a signal from said second memory circuit means.

6. The inspection apparatus of claim 5 including
   said first memory circuit means having a flip-flop,
   said second memory circuit means having a flip-flop,
   said flip-flops initially positioned in different stable states with respect to each other and adapted to change state in emitting a signal, and
   reset means adapted to reestablish said different stable state relationship between said flip-flops immediately after one of said memory circuit means emits a signal.

7. The inspection apparatus of claim 3 including
   a bellows operatively connected with the upper portion of said annular insulating pad, air supply means providing sufficient pressurized air within said bellows to maintain a positive downward force on said annular insulating pad, and said annular lower surface of said insulating pad extending farther downwardly than the uppermost surface of said upper container end wall, whereby movement of said container to said inspection station by said conveyor means causes said container end wall to displace at least portions of said insulating pad generally upwardly to establish firm interengagement therebetween.

8. The inspection apparatus of claim 7 including said first detector means includes a light emitting diode and a receiver therefor, said logic gate means containing first and second logic gates one of which is adapted to permit passage of said eddy current sensor signal therethrough immediately after receipt of said light emitting diode signal, one of said logic gates adapted to permit passage of signals indicating a properly sealed container, and the other of said logic gates adapted to permit passage therethrough of a signal indicating an improperly sealed container whereby said reject means will be activated responsive to the coincidence of an inspection signal passing through said other logic gate and receipt of a signal by said gate from said second detector means.

9. The inspection apparatus of claim 8 including said second detector means includes a light emitting element and a receiver therefor, said reject means has a fluid operated cylinder connected to a container engaging portion, said reject means being operated responsive to operation of a reject solenoid which receives a signal from said memory circuit means, and air supply means adapted to operate said air cylinder to reject an improperly sealed container by moving said container off said conveyor means.

10. The inspection apparatus of claim 8 including said eddy current sensor establishes an electrostatic field which is entered by said container wall when said container is disposed in said inspection station, and said insulating pad is adapted to be operatively positioned in firm overlying contact with an irregularly configurated container wall which is composed of an electrically conductive material.

11. A sensing head for sealed container inspection apparatus comprising a generally tubular sensing head wall having a sensing head top wall secured to the upper end thereof, an insulating pad structure having a transverse wall and a depending annular wall terminating in an annular lower surface, an eddy current sensor disposed within a bore in said insulating pad and secured to said pad, said eddy current sensor disposed generally centrally with respect to the outer periphery of said insulating pad and having a lower surface disposed in a higher plane than said insulating pad annular lower surface, and insulating pad restraining means contacting the upper surface of said pad and urging the same downwardly, whereby said lower surface of said annular sensing head wall is disposed at a higher level than said lower surface of said insulating pad.

12. The sensing head of claim 11 including said restraining means having a bellows secured in overlying position with respect to said insulating pad transverse wall, air supply means operatively connected with said bellows adapted to establish a positive downward force on said insulating pad, and said bellows adapted to yield and permit relative upward movement of said insulating pad responsive to movement of a sealed container into contact with said pad, whereby firm annular contact between said annular pad lower surface and the upper wall of said container is established.

13. The sensing head of claim 12 including said insulating pad is composed of an electrically insulating material, electrical supply means extending through said insulating pad for energizing said eddy current sensor, said air supply means including a pressure regulator and a conduit for introducing air into the interior of said bellows, and the upper extremity of said bellows secured to the lower surface of said sensing head upper wall.

* * * * *

UNITED STATES PATENT OFFICE
CERTIFICATE OF CORRECTION

Patent No. 3,700,101          Dated October 24, 1972

Inventor(s) Richard N. Ference et al

It is certified that error appears in the above-identified patent and that said Letters Patent are hereby corrected as shown below:

Column 3, line 38          Change "or" to --on--.

Column 12, line 10         Change "1" to --11--.

Signed and sealed this 13th day of March 1973.

(SEAL)
Attest:

EDWARD M. FLETCHER, JR.              ROBERT GOTTSCHALK
Attesting Officer                    Commissioner of Patents